United States Patent [19]
Franzo

[11] Patent Number: 5,305,443
[45] Date of Patent: Apr. 19, 1994

[54] MICROPROCESSOR WITH LOW POWER BUS

[75] Inventor: Robert T. Franzo, Emmaus, Pa.

[73] Assignee: AT&T Bell Laboratories, Murray Hill, N.J.

[21] Appl. No.: 8,053

[22] Filed: Jan. 22, 1993

Related U.S. Application Data

[63] Continuation of Ser. No. 668,550, Mar. 13, 1991.

[51] Int. Cl.⁵ .................. G06F 13/364; G06F 1/32
[52] U.S. Cl. .................... 395/325; 364/DIG. 1;
364/230.4; 364/240.1; 364/242.92; 364/239;
364/273.1; 395/750
[58] Field of Search ............ 395/325, 750; 307/475,
307/473, 443, 270; 364/707

[56] References Cited

U.S. PATENT DOCUMENTS

| | | | |
|---|---|---|---|
| 4,430,585 | 2/1984 | Kirk, Jr. | 307/473 |
| 4,494,192 | 1/1985 | Lew | 395/325 |
| 4,531,068 | 7/1985 | Kraft | 307/443 X |
| 4,941,126 | 7/1990 | Haubursin | 307/270 |
| 5,087,840 | 2/1992 | Davies | 307/475 |
| 5,109,493 | 4/1992 | Banerjee | 395/325 |

FOREIGN PATENT DOCUMENTS

0341841A3 of 0000 European Pat. Off. .
92301992 6/1992 European Pat. Off. .
60-242724 12/1985 Japan .

OTHER PUBLICATIONS

German, Elektronik, vol. 33, No. 7, Apr. 1984 Munchen De pp. 43-54; by Hans Eichel.

*Primary Examiner*—Debra A. Chun
*Attorney, Agent, or Firm*—James H. Fox

[57] ABSTRACT

A microprocessor provides a bus state referred to as "loop-back". This state holds the data bus at valid logic levels, without use of resistors, after a read transaction has been completed and there are no pending bus transactions. When this state is entered, the data just read from the data bus is driven back onto the data bus, and the device which had provided the data is placed in the tri-state (high-impedance) condition. This loop-back feature, combined with the fact that all other outputs are held at their previous values, provides for near-zero power dissipation on the bus. The inventive technique avoids the use of pull-up resistors, which are provided on prior art tri-state busses to ensure that the busses do not float and enter the threshold region where high power dissipation occurs.

13 Claims, 4 Drawing Sheets

MICROPROCESSOR WITH LOW POWER BUS

This application is a continuation of application Ser. No. 07/668,550, filed on Mar. 13, 1991.

BACKGROUND OF THE INVENTION

Description of the Prior Art

Integated circuits (ICs) typically communicate with one another by means of one or more multi-conductor busses. For example, a 32-bit microprocessor IC may use 32 conductors to send a 32-bit data word to another integated circuit, or to an external input/output device. Several busses may be required, with the use of separate busses for data and addresses often being used. In other cases, a given bus may be multiplexed so that it may perform two or more functions at different times. In some cases, the output buffers that drive the bus are always active, so that either a valid logic "1" or "0" is always present on the bus. However, in other cases, the output buffers are capable of being placed in the "tri-state" (high output impedance) condition. In that case, neither a high nor low logic state is provided by the output buffer. Therefore, the bus voltage is free to float when all of the integrated circuits connected to the bus are in the tri-state condition. It is frequently the case that resistors are connected from the bus conductors to a given power supply voltage, in order to prevent the bus from floating. This is especially true in busses that connect to devices having field effect transistor input stages. For example, CMOS input buffers having serially connected p-channel and n-channel input transistors which have their gates coupled to the input node may draw a large current when the input node floats in the vicinity of the buffer switching point (typically about $\frac{1}{2} V_{DD}$).

An illustrative prior art bus is shown in FIG. 1, wherein the resistors $R_l \ldots R_n$ pull the bus conductors 1 ... n to the $V_{DD}$ power supply voltage level when all the output buffers $O_l \ldots O_n$ connected to the bus are placed in the tristate condition. As noted above, it is desirable to avoid allowing the conductors to float at an intermediate state between power supply voltage levels, as that could allow the field effect transistor input buffers $I_1 \ldots I_n$ to draw excessive currents. However, the pull-up resistors $R_l \ldots R_n$ themselves cause some power dissipation to occur when the bus is active. That is, when an output buffer places a "0" (i.e., low voltage) on a given conductor, current flows through the corresponding resistor. (Alternatively, the resistors could connect the bus to $V_{ss}$, in which case the current flow would occur when a "1" is driven onto the bus). Since the value of the resistors are typically in the range of from about 1 k ohm to 10 k ohms, several milliamps of current may flow when the bus is active.

It has become especially desirable to minimize the current drain associated with integrated circuits that are used in battery-powered devices. These include, for example, laptop and notebook computers, cellular phones, video terminals, etc. In many cases, the amount of power dissipated in the bus resistors ($R_l \ldots R_n$) is a significant portion of the total power dissipation. Furthermore, as the size of on-chip cache memories increase, the number of bus transactions to external memories tends to be reduced. Therefore, the idle time on the external bus tends to increase, and power dissipation on a floating bus (due primarily to current flow in input buffers) would also increase. Hence, the necessity of using resistors in an attempt to limit the dissipation also tends to increase in prior art bus schemes.

SUMMARY OF THE INVENTION

I have invented an integrated circuit that reduces the power dissipation required to drive a bus. Means are included to maintain the data valid on the bus after receiving acknowledgement of a data transfer.

DETAILED DESCRIPTION

Figure 2:
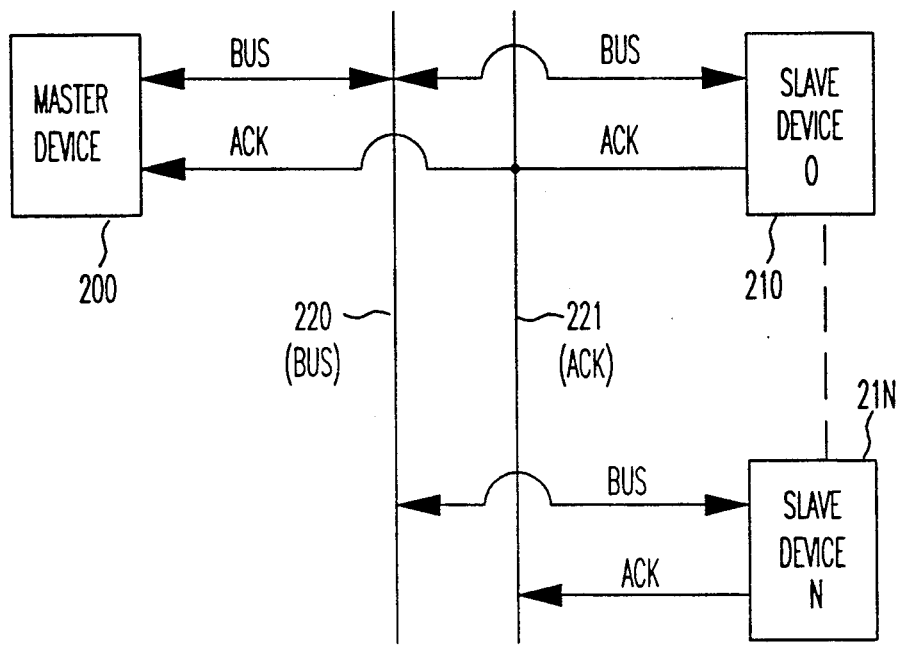
FIG. 2 shows a bus arrangement having a single master device.

The present detailed description relates to an improved technique for communicating data over an integated circuit bus, whereby the power dissipation may be reduced. Referring to FIG. 2, an illustrative bus arrangement suitable for use with the inventive technique is shown. This arrangement is of a type well known in the art, but note that no external resistors are necessary. The "master device" 200 is typically a microprocessor, but may alternatively be a digital signal processor (DSP), arithmetic unit (ALU), or other type of logic device that initiates bus transactions. The "slave devices" 210 to 2IN are typically memory or peripheral devices, including, for example, video displays, keyboards, disc drives, or other input/output devices. When the master device initiates a read operation, it sends a signal on the bus (220) that indicates the device to which it desires access. The signal may be of various protocol types, and the read request initiates the transfer of data from the slave to the master over the bus. The transfer typically occurs in one or more bytes of data bits being sent in parallel (i.e., simultaneously) over the bus conductors. After the designated slave device sends the data, it sends an acknowledgement signal to the master device on the ACK line (221). The output buffers of the designated device connected to the bus then enter the tristate condition.

Figure 4:
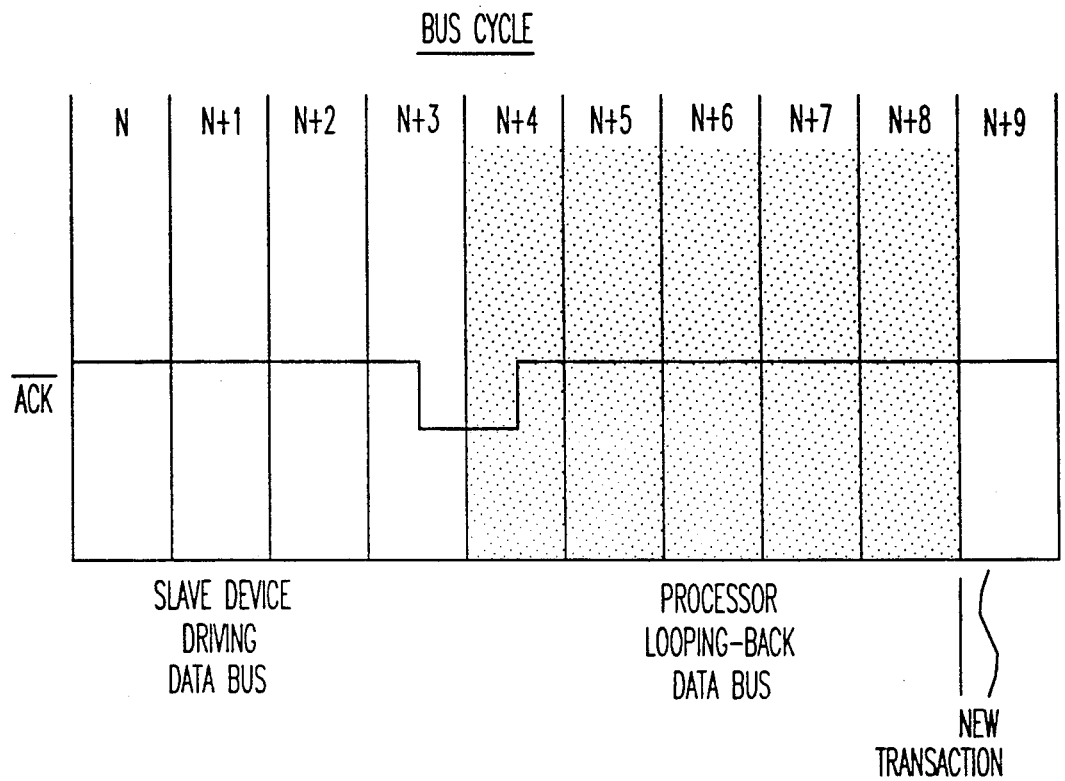
FIG. 4 shows a timing diagram for the bus arrangement of FIG. 2.

In the present invention, the master device 200 enters a "loop-back" state upon receiving the acknowledgement signal when no further transactions are pending. The loop-back state holds valid the data last received by the master device, by actively driving the bus conductors from the master device. This avoids the possibility of floating bus conductors, as would otherwise occur if all the devices connected to the bus were in the tristate condition. The loop-back state also avoids unnecessary signal transitions, as would occur, for example, if all the outputs were changed to the high state in order to avoid the current flow in the circuit of FIG. 1. Referring to FIG. 4, a timing diagram shows the time period (bus cycles N ... N3) during which the slave device drives the data bus with the data requested by the master device. When the data acknowledgement signal ($\overline{ACK}$) is asserted (pulled low) by the slave device; the master device enters the loop-back state, since there are no further transactions pending in the illustrative case. The loop-back state is maintained for bus cycles N+4... N+8. A new transaction is initiated by the master device at bus cycle N+9. The new transaction, which may be either a read or a write operation, terminates the loop-back state, thereby allowing the master device to send the new request over the bus.

Figure 1:
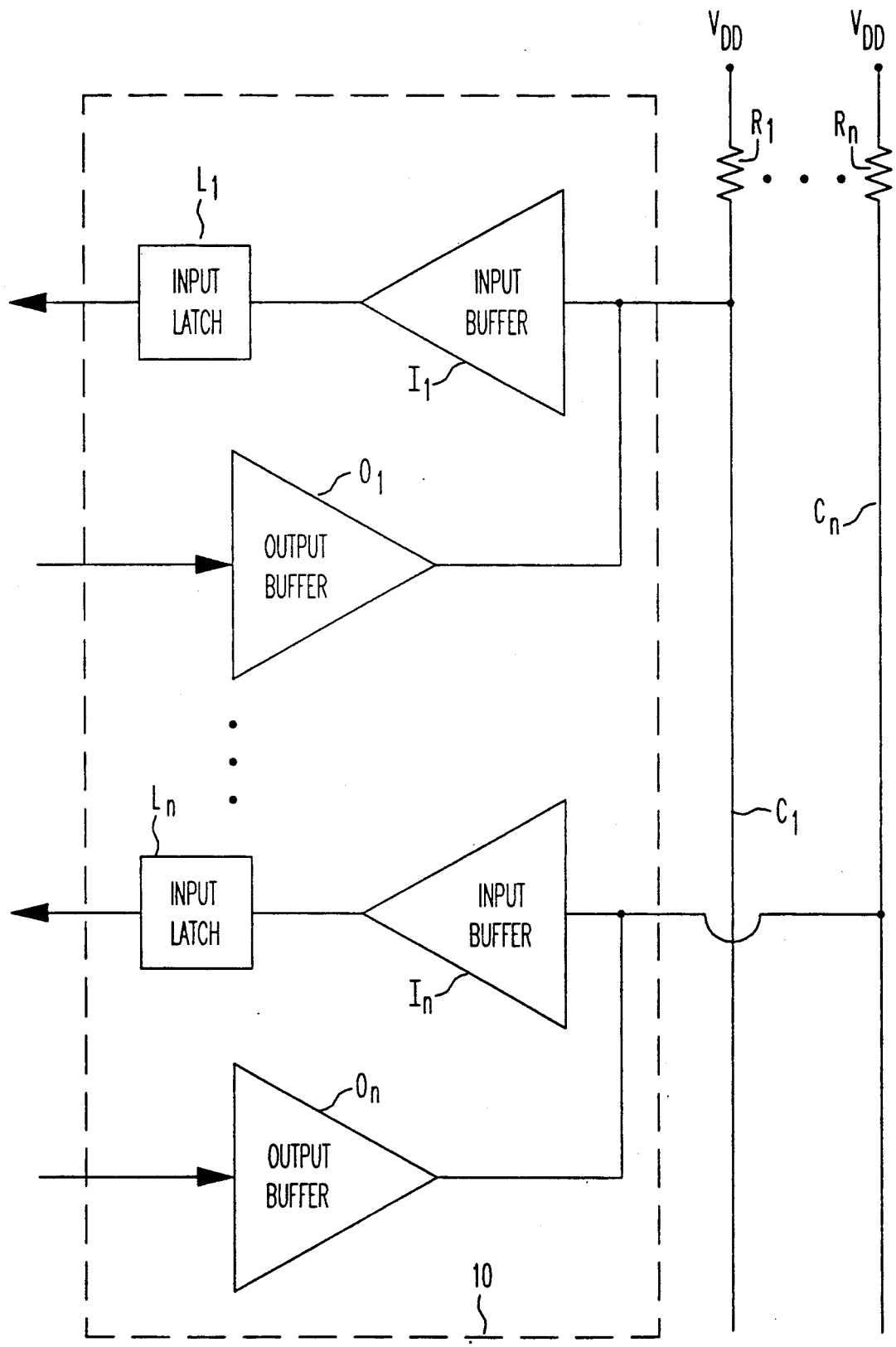
FIG. 1 shows a prior-art bus with pull-up resistors.
Figure 6:
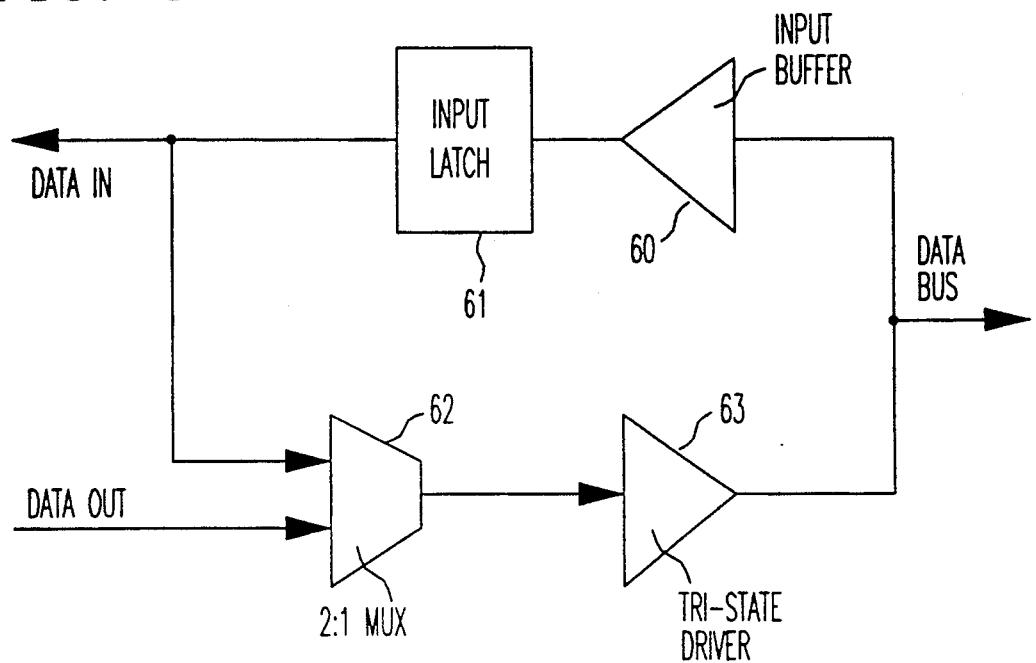
FIG. 6 shows one embodiment of circuitry according to the present invention.
Figure 7:
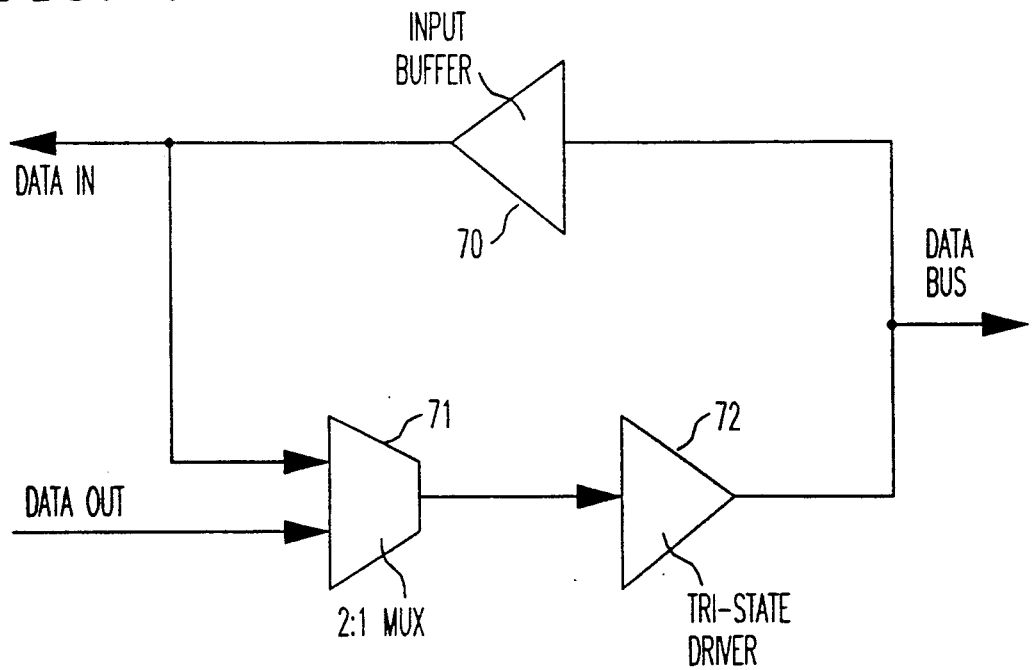
FIG. 7 shows an alternate embodiment of circuitry according to the present invention.

The present invention may be implemented using the illustrative circuit diagrams shown in FIGS. 6 and 7, with others being possible. These circuits are embodiments of an input/output (I/O) buffer on the master device that is connected to the data bus. There are typically "n" such I/O buffers, where "n" is the number of bus conductors (FIG. 1). In FIG. 6, the data bus is connected to an input buffer 60, which drives an input latch 61 that holds the received data for a specified time period. The output of the latch 61 is provided to the other microprocessor circuitry via the DATA IN line, as in the prior art. However, in addition, the output of the latch 61 is looped-back to the output buffer (tristate driver 63) through the 2 to 1 multiplexer 62 during the loop-back state. Therefore, in the loop-back state the data that was last received through the input buffer 60 is latched (held at valid logic levels) back onto the data bus. Note that when the loop-back state is terminated, the multiplexer 62 selects the DATA OUT line, thereby breaking the loop. The I/O buffer may then send or receive new data, as required. Note that the multiplexer may be implemented using transmission gate logic, AND/OR logic gates, or a tri-stated inverter, for example, according to principles well known in the art.

An alternate embodiment of an I/O buffer that may be used for implementing the invention is shown in FIG. 7. In that embodiment, the input latch is omitted, and the output of the input buffer 70 is connected directly to the input of the multiplexer 71. The use of an input latch (61 in FIG. 6) aids in ensuring that any data glitches or noise on the bus do not interfere with the loop-back state. Otherwise, the operation of the circuitry of FIG. 7 is comparable to that of FIG. 6. As above, the multiplexer may select the loop-back state, by connecting input buffer 70 to the input of the output buffer (tristate driver 72), or else may select conventional operation by connecting the DATA OUT line to the input of the driver 72.

Figure 3:
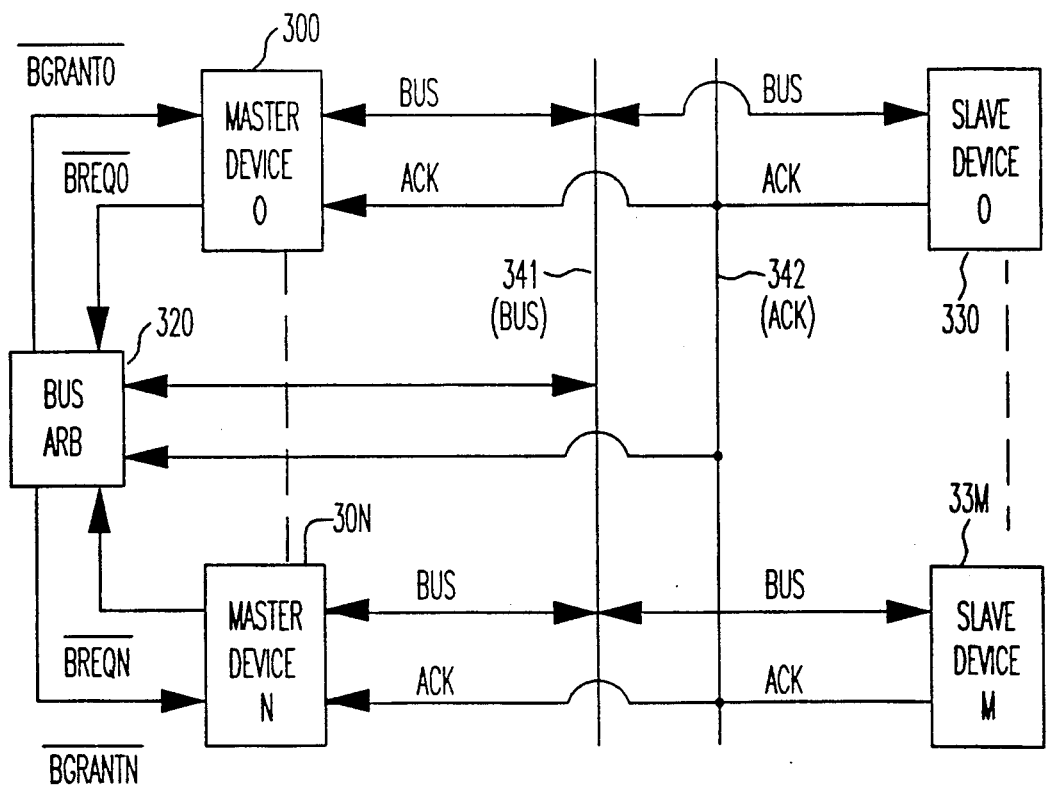
FIG. 3 shows a bus arrangement having two master devices.

The present invention may also be applied to bus architectures that utilize two or more master devices. For example, a microprocessor and floating point processor may communicate over the same bus with various peripheral devices to increase computation speed. In another example, a microprocessor and digital signal processor may share a bus, to provide high-definition graphics, or speech recognition, or other advanced functions. As shown in FIG. 3, a known technique for allowing N master devices (300 ... 30N), and M slave devices (330 ... 33M) to communicate over a bus 341 is shown. For example, when master device 0 desires to initiate a bus transaction, it activates the line $\overline{BREQ0}$ by pulling it to the low state, thereby requesting the bus from the bus arbiter 320. The arbiter 320 grants the request by pulling line $\overline{BGRANT0}$ low, thereby allowing master device 0 to proceed with the bus transaction. Wore that if bus requests from two or more master devices occur simultaneously, the bus arbiter 320 chooses which one is to have access first. The present invention may thus be implemented with this type of architecture, by performing the loop-back with the master device selected by the arbiter to have access at any given time.

Figure 5:
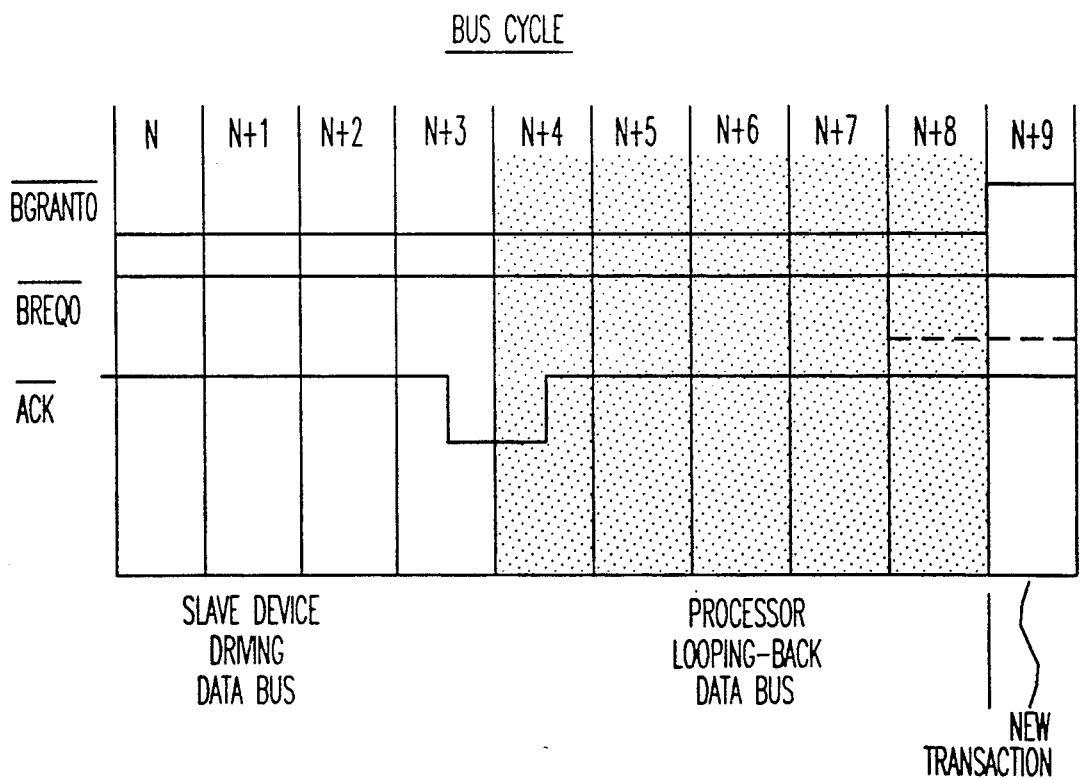
FIG. 5 shows a timing diagram for the bus arrangement of FIG. 3.

For example, referring to FIG. 5, the timing diagram for master device 0 is shown for the above case. In the time period shown, the $\overline{BREQ0}$ line has returned to the high (inactive) state after the above-noted request, indicating no further requests (i.e., no pending transactions) from master device 0. Also as shown, the $\overline{BGRANT0}$ line is initially low (active), thereby granting bus access to master device 0. The data is supplied from the slave device to master device 0 during bus cycles N to N+3, after which the low-going $\overline{ACK}$ line signals the end of the data transfer. The master device 0 then enters the loop-back state during bus cycles N+4 through N+8, as described above. Thereafter, in the illustrative case, another master device with a pending transaction gains access to the bus. When that occurs, the $\overline{BGRANT0}$ line goes high (inactive), so that master device 0 no longer has bus access. Therefore, the loop-back state is terminated for master device 0 at bus cycle N+9. Another way of terminating the loop-back state is when master device 0 itself has a new pending transaction. In that case, a new bus request is made by pulling $\overline{BREQ0}$ low, as indicated by the dotted line at bus cycles N+8 and N+9. In that case, the loop-back state terminates at bus cycle N+8, in order to free up the bus for a new data transfer (either send or receive).

The above description has been given in terms of an integrated circuit communicating on an external bus. However, the present invention may altenatively be applied to communicating on an internal bus within an integrated circuit. This approach becomes desirable, for example, as IC chip densities increase, and more functions communicate over an internal bus. It is especially applicable to wafer-scale integrated circuits, where the number of devices communicating over a given bus within the integated circuit may be large. As described above, the bus is typically a multi-conductor bus having at least 8 conductors, and most typically 16, 32, or 64 conductors in current designs. However, the present invention may also be advantageously used with a single conductor bus. For example, the acknowledgement (ACK) line noted above may be driven in the inventive manner. Furthermore, while the integrated circuits connected to the bus typically include field-effect transistor input stages, the use of the present technique is advantageous for integrated circuits have bipolar input stages in many cases. The output buffer and loop-back circuitry may also be formed with bipolar or field effect devices, depending on the IC technology used. Still other variations and deviations apparent to persons of skill in the art are included herein.

I claim:

1. An integrated circuit comprising:
   a bus master including an output buffer for sending data signals, and an input buffer for receiving data signals, over a bus, and
   means for requesting data to be sent over said bus, from an external device and means for receiving acknowledgement of the receipt of data sent over said bus from said external device;
   characterized in that said integrated circuit further comprises means for maintaining in a valid logic state on said bus the last-received data, when said integrated circuit receives the acknowledgement of the receipt of said last-received data and no further bus requests have been sent by said means for requesting data, and further characterized in that said means for maintaining in a valid logic state on said bus the last-received data comprises a multiplexer responsive to said acknowledgement and said bus requests, and having first and second inputs for selectively coupling either a data out signal, or alternatively the output of said input buffer, to the input of said output buffer;

and wherein the output of said input buffer is directly connected to the second input of said multiplexer.

2. The integrated circuit of claim 1 wherein said input buffer comprises a field effect transistor input stage.

3. The integrated circuit of claim 2 wherein said field effect transistor input stage includes a CMOS input buffer.

4. The invention of claim 1 wherein said bus is external to said integrated circuit.

5. The invention of claim 4 wherein said bus is a multi-conductor bus.

6. The invention of claim 4 wherein said bus is a single-conductor bus.

7. A data system comprising a first master device, a second master device, and a multiplicity of slave devices that communicate over the same bus, wherein the first and second master devices each comprises:

an output buffer for sending data signals, and an input buffer for receiving data signals, over said bus, and means for requesting data to be sent over said bus from a slave device, and means for receiving acknowledgement of the transfer of data sent over said bus from said slave device;

characterized in that said first and second master devices each further comprises means for maintaining in a valid logic state on said bus the last-received data when acknowledgement of the transfer of said last-received data is received, and no further bus requests have been sent by said means for requesting data;

and wherein said data system further comprises arbitration means for choosing which of said first and second master devices has access to said bus at a given time.

8. The data system of claim 7 wherein said output buffer is a tri-state output buffer, and further characterized in that said means for maintaining in a valid logic state on said bus the last-received data comprises a multiplexer having an input directly connected to the output of said input buffer, and having an output coupled to the input of said output buffer.

9. The data system of claim 7 wherein said input buffer comprises a field effect transistor input stage.

10. The data system of claim 9 wherein said field effect transistor input stage includes a CMOS input buffer.

11. The data system of claim 7 wherein said first master device is formed in a first integrated circuit, said second master devices is formed in a second integrated circuit, and said bus is external to said first and second integrated circuit.

12. The data system of claim 11 wherein said bus is a multi-conductor bus.

13. The data system of claim 11 wherein said bus is a single-conductor bus.

* * * * *